United States Patent [19]
Allen et al.

[11] Patent Number: 5,607,701
[45] Date of Patent: Mar. 4, 1997

[54] TUBULAR MELTBLOWING DIE

[75] Inventors: Martin A. Allen; John T. Fetcko, both of Dawsonville, Ga.

[73] Assignee: J&M Laboratories, Inc., Dawsonville, Ga.

[21] Appl. No.: 389,902

[22] Filed: Feb. 16, 1995

[51] Int. Cl.$^6$ .................................................. B29C 47/12
[52] U.S. Cl. ........................... 425/72.2; 425/7; 425/192 S; 425/378.2; 264/12
[58] Field of Search ...................... 425/72.2, 7, 192 S, 425/378.2, 72 S; 264/12; 239/553.3

[56] References Cited

U.S. PATENT DOCUMENTS

| | | | |
|---|---|---|---|
| 2,528,407 | 10/1950 | Yeandle | 425/6 |
| 3,531,053 | 9/1970 | Miller et al. | 239/553.3 |
| 3,970,417 | 7/1976 | Page | 425/72 |
| 5,080,569 | 1/1992 | Gubernick et al. | 425/7 |
| 5,100,435 | 3/1992 | Onwumere | 264/12 |

*Primary Examiner*—Jay H. Woo
*Assistant Examiner*—Iurie A. Schwartz
*Attorney, Agent, or Firm*—R. L. Graham

[57] ABSTRACT

A meltblowing die for producing nonwoven polymer webs includes an inner tube having a plurality of orifices arranged in a row thereon, and an outer tube encasing the inner tube and having a slot formed therein in registry with the row orifices. The inner tube and outer tubes are constructed to define converging air passages on either side of the row of orifices, whereby hot air delivered to the outer tube converges on polymer fibers extruded through the orifices and imparts drag forces thereon to attenuate and draw down the fibers to microsize.

8 Claims, 5 Drawing Sheets

TUBULAR MELTBLOWING DIE

BACKGROUND OF THE INVENTION

The present invention relates to meltblowing dies used in the meltblowing of thermoplastic materials for applying adhesives, coatings, and nonwoven fabrics. More specifically, the present invention relates to a novel tubular meltblowing die which is economical to manufacture and operate.

Meltblowing is a process for producing nonwoven fabrics by extruding a molten thermoplastic through a row of orifices to form a plurality of molten or semimolten fibers. Heated convergent air streams, referred to as primary air, are directed onto opposite sides of the extruded fibers to attenuate and draw down the fibers to microsized diameters. The attenuation is due to a combination of aerodynamic drag and fiber stretching due to interfiber entanglement. The converging air streams and extruded fibers form a fiber/air stream which is directed onto a rotating collector surface where the fibers deposit in a random way to form a nonwoven fabric or web. The web is held together by a combination of fiber entanglement and fiber cohesive sticking while still in the molten or semimolten state. Meltblown webs are used in a number commercially important applications such as filters, battery separators, petrochemical absorbents, and fabrics to name a few.

Meltblown webs are produced using a meltblowing die which typically comprises a die body, a die tip attached to the body, and converging primary air flow passages flanking the die tip. U.S. Pat. No. 4,986,743 discloses a meltblowing die with an elongate die tip having a triangular or tapered nosepiece which terminates in an apex. The nosepiece has a row of side-by-side orifices drilled along the apex and an internal polymer flow passage which is in fluid communication with the orifices. The internal flow passage registers with a polymer flow passage in the die body so that a pressurized polymer melt flowing from the die body into the die tip is extruded through the orifices to form a plurality of side-by-side fibers. The molten polymer is delivered to the die body by a separate apparatus referred to as an extruder.

U.S. Pat. No. 4,986,743 also teaches the use of die components referred to as air plates or air knives bolted to the die body on flanking sides of the die tip nosepiece. The air plates are elongate plates having a tapered edge and are mounted in relation to the nosepiece so that the tapered edge in combination with the tapered nosepiece form air flow passages which converge onto opposite sides of the die tip orifices. The air flow passages register with flow passages in the die body so that pressurized and heated primary air delivered to the body flows into the air flow passages and is discharged as converging air streams which contact the extruded fibers. The streams attenuate and draw down the fibers and blow the fibers onto a moving collector to form the web. The primary air is usually supplied by a compressor or blower and may be heated before entering the die body using in-line electric or gas heaters.

The extruded molten fibers solidify substantially in the fiber/air stream due to cooler ambient air aspirated into the stream. The prior art also teaches the use of a secondary cooler quenching fluid such as air or water directed onto the fibers as they leave the die. The use of quenching fluid permits higher polymer throughput by providing a higher fiber cooling and solidification rate than possible by the use of aspirated air only.

Meltblowing dies of the type described above are usually constructed from high-quality steel to withstand the elevated temperatures and pressures used in meltblowing. The die components tend to have complex geometric forms requiring extensive and precise machining in their construction. This is particularly true of the die body and the die tip which contain a number of irregular internal flow passages which must properly align and seal when the die is assembled. These factors add significantly to the cost of manufacturing meltblowing dies and, therefore, have an impact on the economics of the process.

In addition to initial manufacturing costs, operating costs associated with the power consumption of the primary air mover can be significant. The primary air flow passages in the die body usually contain a number of irregular bends and obstructions which restrict the air flow. Consequently, a major factor in the power consumption of the primary air mover is the flow energy required to overcome pressure losses encountered in these restricted flow passages. Other operating costs include the power consumed in heating the primary air as well as heating the die body with electric heaters, as is often done. Heating the die body is necessary to maintain the polymer inside the die in the liquid phase. Maintenance costs include the purchase of expensive replacement pans such as the die tip where it is not uncommon for the die tip to become plugged or damaged during operation.

U.S. Pat. No. 4,314,670 discloses an atomizer for atomizing liquid water into a spray of droplets. By atomizing the liquid the resulting droplets may be cooled by the ambient air more rapidly than the liquid as a bulk. The atomizer may be applied to industrial applications which require a fine spray such as cooling liquid-cooled machinery, and producing artificial snow. The atomizer of U.S. Pat. No. 4,314,670 comprises an outer tube having an inner manifold tube disposed longitudinally therein. The outer tube has a faceplate attached to the tube with a tapered slot formed along the faceplate. The manifold has a tapered protrusion having at one end a plurality of relatively large flow openings from the center of the manifold into the protrusion, and at the other end a pair of cantilevered and flexible wall elements attached to the protrusion with screws. The flexible elements protrude into the slot of the faceplate and define therewith an inwardly tapered flow passage on either side of the protrusion. In operation air is delivered to the manifold, flows through the flow openings into the protrusion, flows between the elements and is delivered to the faceplate slot. Liquid water is introduced into the outer tube and flows into the tapered flow passages and converges onto opposite sides of the central air flow. The mixing of the water and air flows causes the water to atomize into droplets. The size of the droplets is controlled by the water pressure in the outer tube which causes the flexible elements to deflect thereby changing the width of the tapered flow passages. The patent further discloses that the liquid and air flow may be interchanged.

SUMMARY OF THE INVENTION

The meltblowing die constructed according to the present invention provides an economical die for producing high-quality meltblown webs. The die employs a novel die tip tube mounted within a larger primary air tube and can be adapted to conventional meltblowing extruders and primary air supplies. In such operation, the entire die assembly is sufficiently light-weight and compact to be easily removed and replaced if needed.

The essential components of the present die include a primary air tube which has a longitudinal slot formed along the tube wall. A smaller die tip tube is disposed longitudinally in the primary air tube defining an annular air chamber between the tubes. The die tip tube has a row of equispaced orifices drilled along the tube and is mounted within the primary air tube with the orifice row facing primary air tube slot. Near the orifice row and the slot, the walls of the die tip tube and primary air tube define air flow passages which converge onto opposite sides of the orifices and discharge through the slot.

In operating the present meltblowing die, a pressurized molten thermoplastic within the die tip tube is extruded through the orifices to form a plurality of side-by-side molten or semimolten fibers which flow into the primary tube slot. Pressurized and heated primary air is delivered to the annular air chamber between the tubes and flows into the converging air passages to form air streams which converge onto opposite sides of the orifices. The converging streams contact the extruded fibers and attenuate and draw down the fibers to microsized diameters (viz. 0.5 to 20 μm). The primary air streams entrain the extruded fibers and blow the fibers out of the die through the primary air slot. The fiber/air stream leaving the die is directed onto a moving collector surface where the fibers deposit to form the web.

An important advantage of the present die stems from the fact that the configuration of the primary air flow passages is geometrically less restrictive than that used on conventional dies. As a consequence, the pressure losses and associated power consumption of the air mover are significantly reduced thereby reducing operating costs.

Another advantage of present meltblowing die is associated with the tubular design wherein the heated primary air fills the annular air chamber surrounding the die tip tube and the molten thermoplastic inside the die tip. In operation, the primary air is heated to a temperature higher than that of the thermoplastic so that the air will heat the die tip tube thereby maintaining the thermoplastic inside the tube in the liquid phase. The present meltblowing die reduces the energy consumption and cost associated with electrically heated dies.

In a preferred embodiment of the invention, the extruded fibers are cooled and solidified by ambient air naturally aspirated into the fiber/air stream outside the die. In an alternate embodiment the present die further includes flow means for delivering a cooler quenching fluid (air) onto the fibers. The application of quenching air permits a higher polymer throughput by providing a higher rate of fiber solidification.

The present invention provides a low pressure loss meltblowing die for producing high-quality nonwoven polymer webs. The essential components of the die are of relatively simple design and inexpensive from a manufacturing standpoint, and can be made substantially from commercially available steel pipe or tubing stock.

DESCRIPTION OF THE PREFERRED EMBODIMENTS

Figure 1:
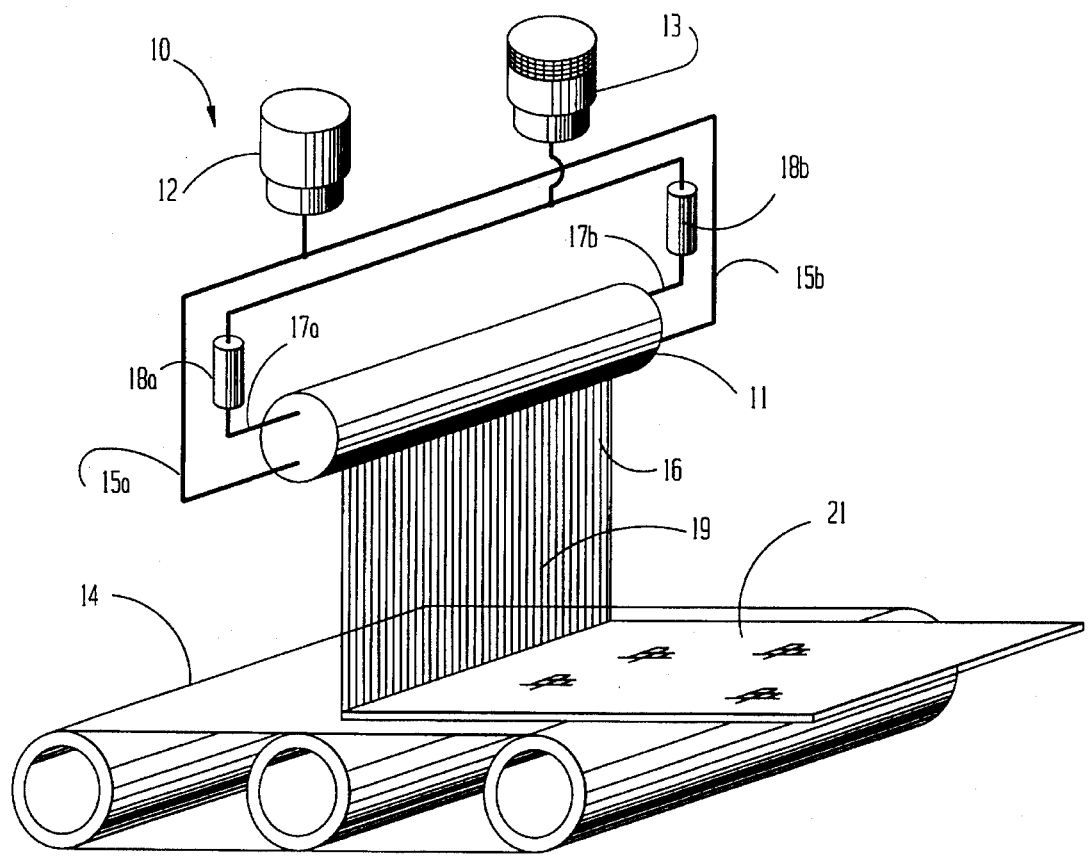
FIG. 1 is an elevational view of the present tubular meltblowing die in operation.

As illustrated in FIG. 1, meltblowing system 10 comprises tubular die 11, extruder 12, primary air source 13, and rotating collector 14. Extruder 12 supplies a molten thermoplastic to die 11 through flow lines 15a and 15b. Die 11 extrudes the polymer to form a plurality of side-by-side molten or semimolten fibers 16. Primary air is supplied to die 11 from air blower 13 via air flow lines 17a and 17b which include in-line heaters 18a and 18b, respectively, for heating the air to the meltblowing temperature. As described below, the primary air attenuates the fibers and forms fiber/air stream 19 which flows onto rotating collector screen 13 where the fibers deposit to form web 21. The web is continuously withdrawn from the collector by mechanical means such as a winding apparatus. Fibers 16 may be substantially continuous fibers or discontinuous filaments. The terms fibers and filaments are hereafter used interchangeably.

Figure 2:
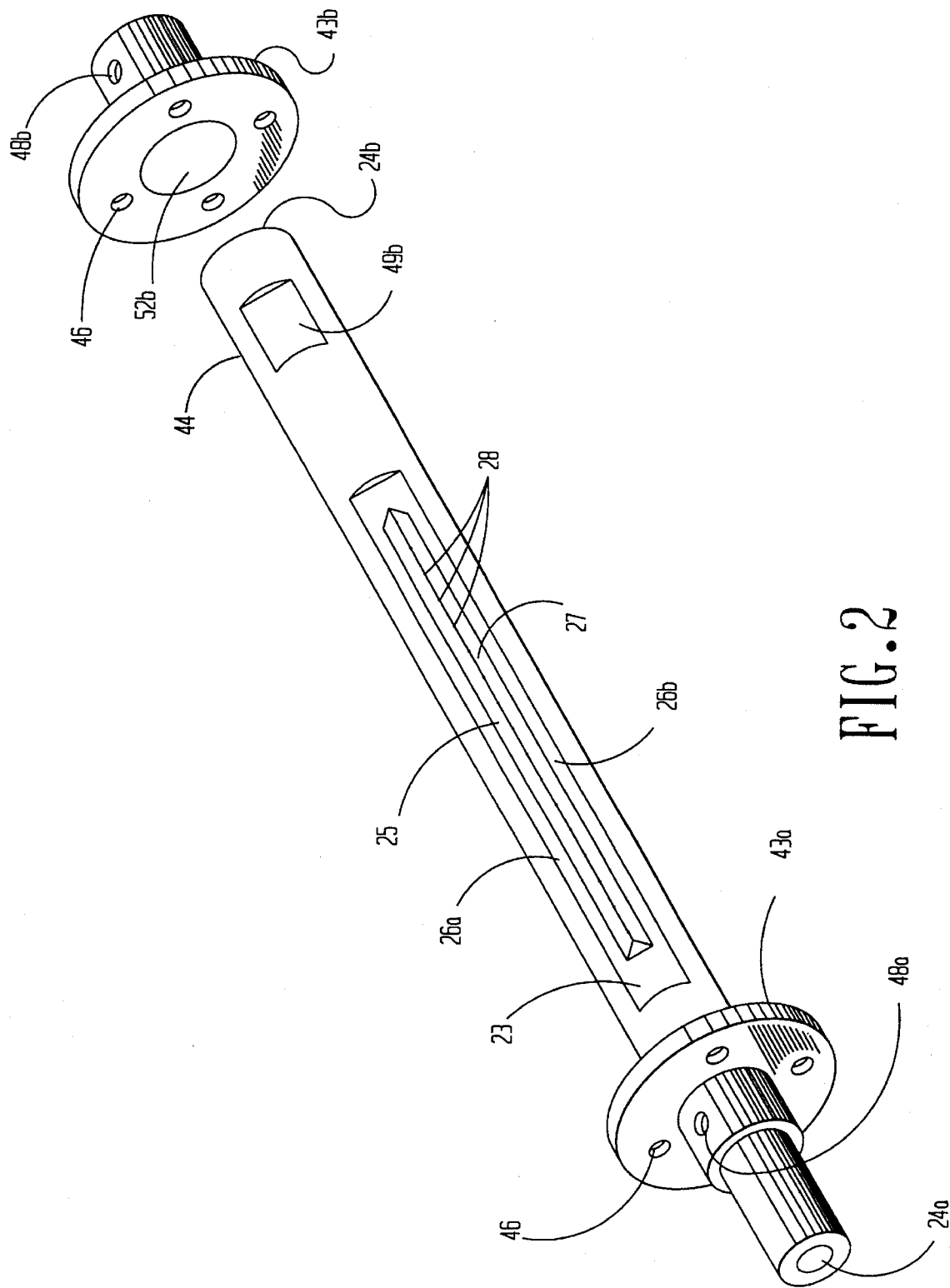
FIG. 2 is a front elevational view of the die tip tube and slidable mounting flanges.
Figure 4:
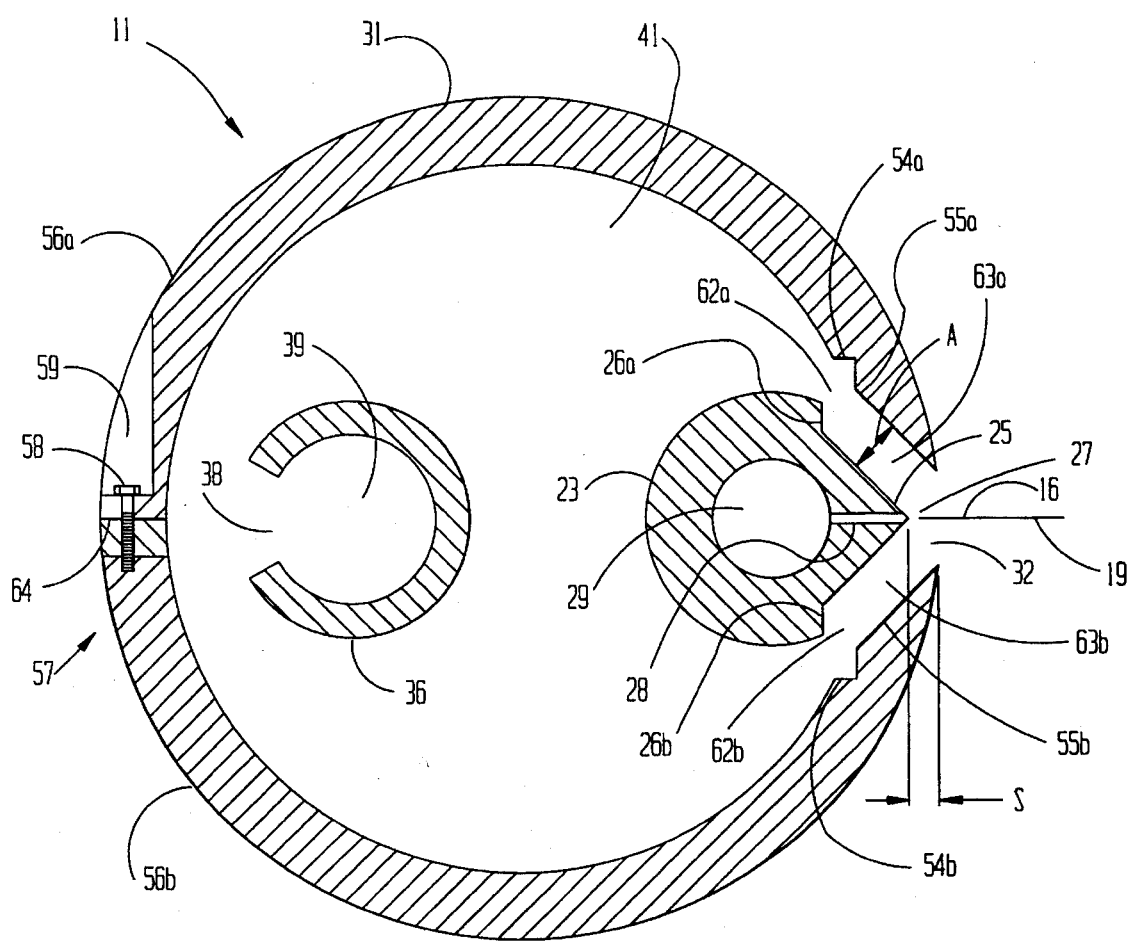
FIG. 4 is a cross sectional view of the tubular meltblowing die.

As seen in FIGS. 2 and 4, die 11 includes die tip tube 23 which has inlets 24a and 24b at each end. Die tip 23 has an intermediate region whereon elongate nosepiece 25 is formed. Flanking the nosepiece are machined flat surfaces 26a and 26b. Nosepiece 25 is triangular in cross section and terminates in apex 27. Drilled along the apex is a plurality of equally spaced side-by-side orifices 28. Orifices 28 are drilled through the tube wall and are in fluid communication with the interior of the die tip tube.

Polymer flow lines 15a and 15b are connected to inlets 24a and 24b, respectively, for delivering a pressurized polymer melt from extruder 12 to die tip tube central polymer flow passage 29. Lines 15a and 15b may be connected using fittings (not shown). Due to the internal fluid pressure inside the die tube, the polymer melt is extruded through orifices 28 to form a plurality of side-by-side fibers 16. Injecting the polymer into both sides of die tip 23 acts to equalize the fluid pressure over the length of the die so that the polymer is extruded through each of orifices 28 at approximately the same rate. Die tip tube may be machined from an integral piece of stock tubing having a wall thickness sufficient permit the formation of nosepiece 25, as well as providing sufficient remaining wall material in the nosepiece region to withstand the internal pressure in the tube.

Figure 3:
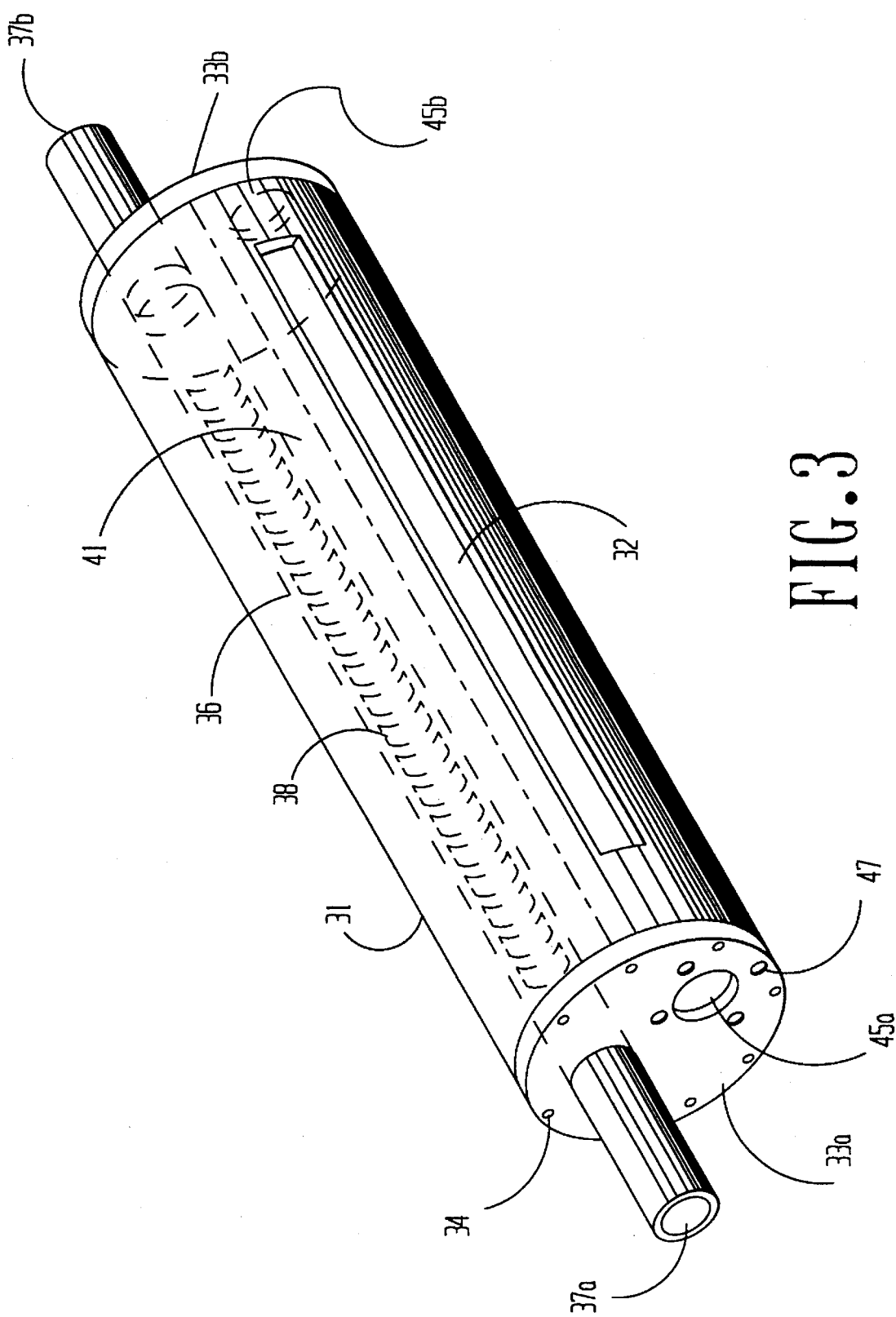
FIG. 3 is a front elevational view of the primary air tube and primary air manifold.

As seen in FIGS. 3 and 4, die 11 further comprises primary air tube 31 having frontal slot 32 and end endplates 33a and 33b. The endplates are attached to the tube using machine screws 34 and form fluid seals around the periphery of the tube. Primary tube 31 has disposed longitudinally therein primary air manifold 36 which has inlets 37a and 37b and a plurality of slob 38 formed along the manifold. Slots 38 face the rear of the primary air tube 31 as best seen in FIG. 4. Manifold 36 may be sealingly attached to endplates 33a and 33b using flanges as described below in relation to die tip tube 23. Alternatively, the manifold may be welded to the endplates.

Air flow lines 17a and 17b are attached to inlets 37a and 37b, respectively, for delivering air from source 13 to manifold central flow passage 39. The air is discharged through slots 38 to fill annular chamber 41 with pressurized air. The air is heated by heaters 18a and 18b (see FIG. 1) before entering manifold 36 so that the primary air inside chamber 41 is at an elevated temperature. In operation, the air will be heated to a temperature higher than the melting point temperature of the polymer being processed through die tip 23. An alternative embodiment of the present invention comprises eliminating air manifold 36 and injecting the air directly into each end of the primary air tube through fittings threaded into endplates 33a and 33b.

As best seen in FIGS. 2 and 3, for installing the die tip 23 into primary tube 31, flange 43b is slidingly removed from die tip end 44. End 44 passes into primary tube 31 through endplate hole 45a and is inserted the length of the tube, die tip end 44 passes outwardly through endplate hole 45b, and flange 43b is slidably installed on protruding end 44. It should be noted that FIG. 2 is an enlarged view of the die tip tube intended to show details of the tube. In reality, of course, the size of the die tip tube in relation to the primary air tube is as illustrated in FIG. 4 wherein the outer diameter of die tip 23 is compatible with primary tube endplate holes 45a and 45b illustrated in FIG. 3. Flanges 43a and 43b are bolted to endplates 33a and 33b, respectively, using bolts (not shown) through flange clearance holes 46 into threaded endplate holes 47 whereby a fluid seal is established between the flanges and the endplates.

Flanges 43a and 43b are fixed to the die tip tube 23 using set-screws (not shown) threaded into holes 48a and 48b provided on the flanges. Die tip tube 23 has flat compression surfaces 49a (not shown) and 49b which in operation align with the set-screw holes 48a and 48b, respectively. Upon tightening the set-screws onto the compression surfaces, die tip orifice row 28 is held in flow alignment with primary tube slot 32 with the orifice row centered approximately on the slot. Precision machining is used so that the clearance between flange center holes 52a and 52b and the outer periphery of die tip tube 23 is extremely small whereby tightening the set-screws establishes substantially a fluid seal between the flange and the outside of the die tip tube.

Die tip 23 may be removed from primary air tube 31 by reversing the above installation procedure. Thus an important advantage of the present invention is the ease by which die tip tube 23 may be removed and replaced. As has been mentioned, air manifold 36 may be attached to endplates 33a and 33b using flanges similar to 43a and 43b.

As best seen in FIG. 4, die tip tube 23 is mounted eccentrically in primary tube 31 with die tip orifice row 28 biased in the direction of slot 32. A pressurized molten thermoplastic flows from the extruder 12 into the central die tip passage 29 via flow lines 15a and 15b as has been described. The thermoplastic is extruded through orifices 28 to form a plurality of side-by-side molten or semimolten fibers 16 which discharge into slot 32.

Primary air tube 31 has square grooves 54a and 54b formed along the interior frontal wall of the tube. The grooves intersect with inwardly tapered walls 55a and 55b which terminate at the outlet of slot 32. To facilitate access to the interior of primary air tube 31 for machining the grooves and tapered walls, the air tube is formed from two semicylindrical shells 56a and 56b which are joined along the backside of the tube at 57 by a plurality of bolts 58 spaced along the tube. Clearance channel 59 is provided to access the bolts.

Flat surfaces 26a and 26b of die tip 23 oppose air tube grooves 54a and 54b and in combination therewith define air flow passages 62a and 62b, respectively. Passages 62a and 62b feed convergent flow passages 63a and 63b, respectively, which are defined by tapered walls 55a and 55b and the complimentary surfaces of die tip nosepiece 25. Passages 63a and 63b are elongate passages which extend the length of primary air tube slot 32. As best seen in FIG. 4, pressurized air flows through manifold passage 39, through slots 38, and fills and pressurizes annular chamber 41. The pressurized air enters passages 62a and 62b and flows into passages 63a and 63b to form convergent sheets of air which converge onto opposite sides of orifices 28. The converging sheets of air contact the extruded fibers and attenuate and draw down the fibers to microsized diameters. The air sheets and fibers form a fiber/air stream 19 which leaves the die and flows onto a collector mechanism or other substrate.

It should be noted that the air flow configuration comprising chamber 41 feeding flow passages 62a, 62b, 63a, and 63b of the present die is less restrictive from a fluid flow standpoint than that used on prior art dies. The less restrictive geometry significantly reduces pressure losses in the flow passages and thereby reduces the required power input to the primary air mover. The power reduction lowers operating costs and improves the efficiency of the process.

Another advantage of the present invention stems from the fact that heated air in chamber 41 surrounds die tip tube 23 and the molten polymer therein. The air is heated to a temperature above the polymer temperature and consequently, heat flows from the air to the polymer though tube 23 and into the polymer therein, thereby acting to maintain the polymer in the liquid phase. The die tip is constructed from metal having a high thermal conductivity which readily conducts the heat. The present configuration eliminates the need for other heat sources for heating the polymer inside the die.

The present meltblowing die provides for variable air-gap and set-back settings to optimize the die performance and for meltblowing different thermoplastics The air-gap is defined in FIG. 4 as dimension A, and the set-back is designated S. Variable air-gap is provided by spacer strip 64 inserted between shells 56a and 56b with dimension A increasing with thickness of the spacer. Spacer strips of different thickness can be interchanged to vary the air-gap. The set-back is adjusted by moving the die tip tube 23 radially inward or outward with respect to the primary air tube 31. This is accomplished by providing primary air tube endplates 33a and 33b with oversized endplate holes 45a and 45b for moving the die tip 23 radially therein. Also provided are specially designed die tip flanges 43a and 43b having eccentric center holes 52a and 52b for receiving the die tip tube 23. Upon bolting the flanges to endplates 33a and 33b and tightening set-screws 48a and 48b as has been described, the die tip is secured eccentrically in endplate holes 45a and 45b thereby altering the set-back. A particular set-back is achieved by specifying through engineering analysis the magnitude of the eccentricity of the flange center holes 52a and 52b.

Although the present die has been described in relation to the use of circular tubing to form the die tip and primary air tubes, other types of tubing may be used as well. The present invention also contemplates the use of tubing such as triangular or box-type extrusions.

Figure 5:
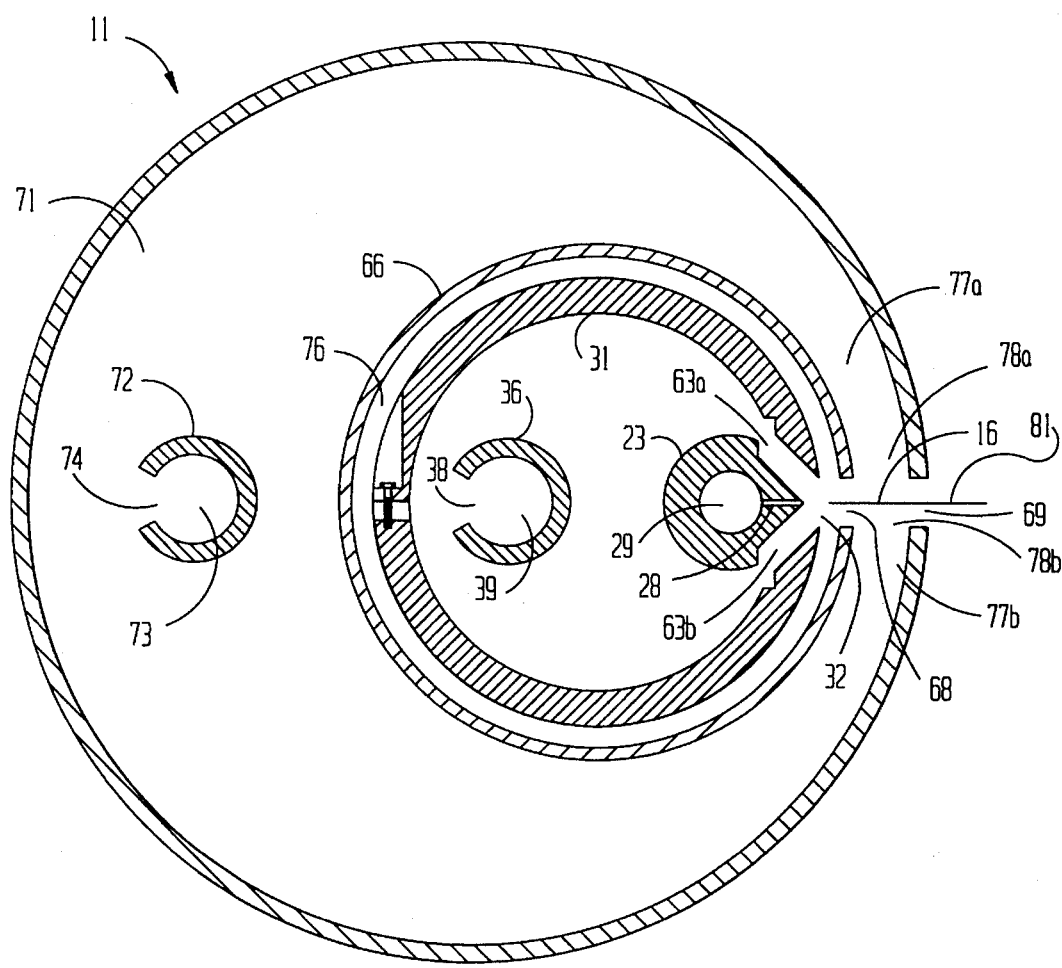
FIG. 5 is a cross sectional view of the present meltblowing die illustrating the use of quenching fluid.

FIG. 5 illustrates an alternate preferred embodiment of the present tubular meltblowing die invention wherein a quenching fluid (air) is provided. Meltblowing die 11 comprises primary air tube 31, die tip tube 23, and air manifold 36 which are constructed and operate in the same manner as described in detail above. It being sufficient to note again that molten or semimolten fibers 16 are discharged through primary air tube slot 32.

Meltblowing die 11 further comprises heat shield tube 66 and quench air tube 67 which extend the full length of the die. Heat shield 66 is slightly larger than primary air tube 31 and comprises frontal slot 68 in flow alignment with primary air tube slot 32. Quench air tube 67 has frontal slot 69 in flow alignment with heat shield slot 68, primary air tube slot 32 and die tip orifices 28. As can be seen in FIG. 5, fibers 16 flow through slot 32, through slot 68, and are discharged through slot 69.

Outer quench tube 67 in combination with heat shield 66 defines annular quench air chamber 71 which is fed by quench air manifold 72. Manifold 72 is constructed according to the same design as primary air manifold 36 and comprises central flow passage 73 and a plurality of slots 74. Manifold 72 will have inlet lines (not shown) connected to a source of cooler pressurized quench air. The air may be refrigerated air or simply ambient air fed into manifold 72. Quench air entering flow passage 73 discharges through slots 74 to fill chamber 71 with quench air. Heat shield 66 acts to resist heat loss from the heated primary air within chamber 41 to the cooler quench air in chamber 71. Quiescent air layer 76 having a low thermal conductivity further resists the heat loss form the primary air.

Quench tube 67 and shield tube 66 define converging conduits 77a and 77b for conducting quench fluid from chamber 71 to discharge at 78a and 78b, respectively. The cooler quench air converges onto opposite sides of extruded molten or semimolten fibers 16 and acts to rapidly solidify the fibers. Fiber/air stream 81 consisting of fibers 16, the primary air flow, and the quench air flow discharges from the die and flows onto a collector device to form a meltblown web. The use of quench air permits a higher polymer throughput than possible without quenching.

The components of the present meltblowing die are constructed from high-quality steel. The tubular components such as primary tube 31 and die tip 23 can be manufactured from commercially available steel tubing. The dimensions of the die components will depend on the desired web size and the composition of the thermoplastic used. For meltblowing polypropylene using the tubular die embodied in FIG. 4 with a die length of 0.5 meters, the following table gives preferred dimensions.

| Component | Broad Range | Preferred Range |
|---|---|---|
| I.D./O.D of die tip tube (in) | 1.0/1.5 to 3.0/4.0 | 1.5/2.25 to 0.8/2.5 |
| I.D./O.D. of primary air tube (in) | 5.0/5.5 to 10.0/12.0 | 7.0/8.2 to 9.0/10.8 |
| die tip orifice spacing (orifices/in) | 5 to 30 | 20 to 25 |
| die tip orifice diameter (mm) | 0.1 to 2.0 | 0.4 to 1.0 |
| set-back (dimension S in FIG. 4) (cm) | 0.02 to 0.9 | 0.1 to 0.5 |
| air-gap (dimension A in FIG. 4) (cm) | 0.02 to 0.2 | 0.05 to 0.1 |
| internal angle of converge of die tip nosepiece (degrees) | 10 to 90 | 30 to 60 |

For meltblowing polypropylene using the tubular die with air quenching embodied in FIG. 5, the above data apply as well. The diameters of heat shield 66 and quench tube 67 are sized in relation to the size of primary air tube 31 as the case may be.

The present tubular die may be used for processing any of the thermoplastics normally used in meltblowing. The preferred polymer is polypropylene, however, other materials include low and high density polyethylene, ethylene, copolymers (including EVA copolymer), nylon, polyamide, polyesters, polystyrene, poly-4-methylpentene, polymethylmethacrylate, polytrifluorochloroethylene, polyurethanes, polycarbonates, silicones, and blends of these.

In operation, the meltblowing die will be connected to an extruder, a primary air supply, and a quenching air supply as has been described. The die tip tube will normally be preheated to a temperature above the melting point of the thermoplastic to melt any residue in the die tip from previous operation. This can be accomplished using electric induction heating by connecting a high voltage, low current electrical source across the ends of die tip tube 23. The electric heating is discontinued after steady operation is achieved. The primary air flow is activated and adjusted to the desired flow rate and temperature. The primary air temperature is set above the melting point of the thermoplastic to achieve heating of the die tip tube by the surrounding primary air in the primary air chamber. The molten thermoplastic flow is activated and set to the desired flow rate. Finally, the quenching air is activated and the flow rate set to the desired value. Steady state operation is achieved shortly thereafter.

For meltblowing polypropylene with a die whose dimensions fall within the preferred ranges above, the following operating conditions are preferred.

| Operating Condition | Broad Range | Preferred Range |
|---|---|---|
| primary air temperature (°F.) | 400 to 1000 | 500 to 800 |
| primary air flow rate (scfm/in) | 5 to 40 | 10 to 25 |
| polymer temperature (°F.) | 400 to 700 | 450 to 550 |
| polymer flow rate (gm/hole/min) | 0.1 to 5.0 | 0.5 to 3.0 |
| quench air temperature (°F.) | 10 to 100 | 40 to 75 |
| quench air flow rate (scfm/in) | 10 to 80 | 20 to 50 |

What is claimed is:

1. A meltblowing die, comprising:

a) an outer tube having an elongate slot formed therein, said slot defined by elongate converging wall sections;

b) an inner tube mounted in the outer tube and having a triangular nosepiece defined by converging wall sections which terminate in an apex, and a plurality of orifices arranged in a row along the apex and being in registry with the slot, the wall sections of the nosepiece in combination with the wall sections of the slot defining converging flow passages, one passage on each side of the orifice row;

c) means for delivering pressurized molten polymer into the inner tube whereby the polymer is extruded through the orifices and discharged therefrom as filaments; and d) means for delivering pressurized and heated air to the outer tube whereby air flows into the converging air passages and is discharged as converging air streams onto opposite sides of the extruded filaments, the contact angle of the streams on the filaments being such to impart a drag force on the filaments to draw down the filaments and to form a filament and air stream which discharges through the slot.

2. The apparatus of claim 1 wherein the die tip tube further comprises a frontal wall having formed thereon a tapered nosepiece terminating in an apex, the orifice row being drilled along the apex of the nosepiece.

3. A meltblowing die, comprising:

a) a primary air tube having a frontal wall a longitudinal slot formed therein, the slot comprising opposing tapered surfaces which are inwardly tapered in the radial inward direction;

b) a die tip tube mounted within the primary air tube defining an annular space therebetween, the diet tip tube comprising a frontal wall having formed thereon a tapered nosepiece terminating in an apex with a row of spaced apart orifices drilled through the apex, the nosepiece protruding in parallel relationship into the primary air tube slot and in combination therewith defining converging air flow passages which converge onto opposite sides of the orifice row, the passages being in fluid communication with the annular space;

c) means for delivering pressurized molten polymer to the die tip tube whereby the polymer is extruded through the orifices to form a molten or semimolten fibers;

d) means for delivering pressurized and heated air to the annular space whereby the air flows into the converging air passages to form converging air streams which contact the extruded fibers at an oblique angle to impart a drag force thereon to draw down the filaments to microsized diameters, and to form a fiber and air stream; and e) a collector for receiving the fiber and air stream to form a nonwoven fabric thereon.

4. The apparatus of claim 3 wherein the orifice spacing is between 5 to 30 orifices per inch and the overall length of the orifice row is between 1 to 100 inches.

5. The apparatus of claim 3 wherein the primary air tube and the die tip tube are substantially circular tubes, and the outer diameter of the die tip tube is between 1.5 to 4 inches and the inner diameter of the primary air tube is between 5 to 10 inches.

6. The apparatus of claim 3 wherein the primary air tube is formed from two semicylindrical shells which are attached at the back wall of the tube, and having a spacer element disposed between the shells at the point of attachment, the width of the primary air tube slot being adjusted by the width of a spacer element.

7. The apparatus of claim 3, further comprising a quench air tube disposed around the primary air tube and having a frontal slot formed therein, the quench tube slot being in registry with the primary air tube slot and die tip orifices, the quench tube and primary air tube defining therebetween converging quench air flow passages which converge onto opposite sides of the outlet of the primary air tube slot, and further comprising means for delivering quench air to the passages to form converging quench air streams which contact the extruded fibers at or near the outlet of the primary air tube slot.

8. The apparatus of claim 7 which further comprises a heat shield tube disposed between the primary air tube and the quench air tube.

* * * * *